(12) United States Patent
MacLachlan

(10) Patent No.: US 6,467,610 B1
(45) Date of Patent: Oct. 22, 2002

(54) MODULAR CONVEYOR BELTS WITH PIN-RETAINED ATTACHMENTS

(75) Inventor: Gilbert J. MacLachlan, Chalmette, LA (US)

(73) Assignee: The Laitram Corporation, Harahan, LA (US)

( * ) Notice: Subject to any disclaimer, the term of this patent is extended or adjusted under 35 U.S.C. 154(b) by 0 days.

(21) Appl. No.: 09/969,226

(22) Filed: Oct. 2, 2001

(51) Int. Cl.[7] ............................................. B65G 13/02
(52) U.S. Cl. ................................. 198/699.1; 198/853
(58) Field of Search ............................ 198/698, 699.1, 198/850, 853

(56) References Cited

U.S. PATENT DOCUMENTS

| | | | |
|---|---|---|---|
| 4,729,469 A | * 3/1988 | Lapeyre et al. | 198/853 X |
| 4,832,183 A | 5/1989 | Lapeyre | |
| 5,165,514 A | * 11/1992 | Faulkner | 198/699.1 X |
| 5,413,211 A | * 5/1995 | Faulkner | 198/853 X |
| 5,469,956 A | 11/1995 | Greve et al. | |
| 5,497,874 A | 3/1996 | Layne | |
| 6,227,356 B1 | * 5/2001 | Van Zijderveld et al. | 198/850 |
| 6,382,404 B1 | * 5/2002 | Guldenfels | 198/699.1 X |

* cited by examiner

Primary Examiner—James R. Bidwell
(74) Attorney, Agent, or Firm—James T. Cronvich (57) ABSTRACT

A modular conveyor belt with pin-retained attachments. The conveyor belt is constructed of a series of rows of side-by-side belt modules hingedly interconnected end to end by hinge pins through interleaved hinge eyes of adjacent rows. Selected modules are base modules that include upstanding members extending from intermediate module structure. Belt attachments, such as flights, include depending connection members with shank portions that interleave with the upstanding members of the base module. One or more aligned apertures through the interleaved connection members and upstanding members form passageways across the base modules for connecting pins that hold the attachment to one or more base modules.

27 Claims, 6 Drawing Sheets

MODULAR CONVEYOR BELTS WITH PIN-RETAINED ATTACHMENTS

BACKGROUND

This invention relates generally to power-driven modular conveyor belts and, more specifically, to conveyor belts and modules with attachments retained by a connecting pin.

Because they do not corrode, are positively driven by sprockets, and are easy to repair, modular plastic conveyor belts are widely used to convey a variety of articles. Modular plastic conveyor belts are made up of molded plastic modular links, or belt modules, that can be arranged side by side to form a belt row of selectable width. Series of spaced-apart hinge eyes extending from the leading and trailing ends of the modules include aligned openings forming passageways to receive pivot rods, or hinge pins. The hinge eyes along one row interleave with the hinge eyes of an adjacent row. Hinge pins extending through the passageways join adjacent rows of modules together into a conveyor belt and form hinge joints at which the belt can articulate.

Many applications require a conveyor belt to transport articles along an inclined path. To prevent articles, especially bulk products, from sliding down the conveying surface of a belt as it traverses an incline or a decline, flights are often used. Typically, flights are in the form of rectangular plates extending perpendicularly from the conveying surface of a belt. Flights form walls past which conveyed articles cannot slide. In most modular plastic belts, flights are integrally molded as part of a belt module. Because the molds for simple flight designs are typically two-piece molds and relatively inexpensive, a manufacturer may be able to afford a different mold for each simple flight variation. But each time a new application calling for a flight revision arises, a new mold must be cut. Furthermore, flights with complex topologies can require expensive molds and molding techniques. For example, some applications, such as conveying fruits upward out of a liquid-filled vat, may demand drain holes through the flight. Molding the drain holes in an integral flighted module requires a complicated and much more expensive mold of three or more pieces. Thus, supplying a variety of flights of varying designs requires an extensive inventory of expensive molds.

Another shortcoming with integrally-molded flighted modules is that the width of the flight is typically coextensive with the width of the module base. When assembled side by side in the row of a conveyor belt, flighted modules have a seam between them. Longitudinal seams between belt modules across the width of a belt row significantly diminish the beam strength of the belt.

Cleanability is another important concern in many belt applications, especially in food handling applications. It is important to minimize the number of crevices and crannies that can harbor bacteria in a belt. But avoiding all trouble spots in a modular conveyor belt with its many pieces is impossible. One of the most troublesome areas is the hinge between belt rows. Unless precautions are taken, bacteria can reside along the hinge pin at the hinge eyes. That's why modular conveyor belts for conveying food products are usually designed with open hinges that expose a large percentage of the hinge pin. In this way, the hinges are easy to view and to clean by jet spraying, for instance. Food processors are experienced in cleaning belts and have developed further expertise in cleaning belt hinges.

Because integrally-molded flighted modules do not have gaps between the flight and the conveying surface, cleaning them is straightforward. But belt modules having detachable elements, such as flights, hold down tabs, and high-friction inserts, can present a cleaning problem. By providing hiding places for bacteria, the interfaces between the belt modules and the attachments require special attention. To clean the belt effectively for it to pass required inspections, a food processor may have to use a more complex cleaning system that can clean both hinges and attachment points. For this reason, detachable belt accessories are not so common in certain food applications.

Thus, there is a need for a modular conveyor belt that can be customized with a variety of attachments, as well as a conveyor belt with accessories that are easy to clean.

SUMMARY

These needs and others are satisfied by a modular conveyor belt embodying features of the invention. The conveyor belt is constructed of a series of rows of belt modules. Each row includes at least one module extending from a first end to a second end in the direction of belt travel. A first set of hinge eyes is disposed along the first end, and a second set of hinge eyes, along the second end. The rows are arranged end to end with the first set of hinge eyes of a row interleaved with the second set of hinge eyes of an adjacent row. Hinge pins disposed in aligned openings in the interleaved hinge eyes connect adjacent rows into a conveyor belt and form a hinge between adjacent rows. At least some of the modules are base modules that may include intermediate structure with upstanding members spaced apart across their widths. Aligned apertures are formed in the base modules, such as through the upstanding members. A belt attachment, such as a custom flight, has spaced apart connection members with aligned apertures. The connection members are arranged with the base modules, such as interleaved with the upstanding members. The apertures of both are aligned and form a passageway to receive a connecting pin that retains the belt attachment to the base module. In this way, a variety of custom attachments can be mounted on a conveyor belt.

Some custom attachments include a flight portion and a perforated flight portion for good drainage. To increase the beam strength of the belt, the belt can be constructed with the belt attachment spanning the seam between side-by-side base modules.

In other versions of the modular conveyor belt, second aligned apertures are formed in the upstanding members of the base modules and in the connection members of the attachments. These second aligned apertures form a second passageway through the interleaved upstanding members and connection members. A second connecting pin resides in this second passageway to constrain, with the first connecting pin, the attachment firmly to the base module.

In another version, the belt attachment includes stabilizing structure that interfits with the intermediate structure of the base modules. This interfit, in conjunction with the connecting pin, holds the belt attachment in place. The stabilizing structure can be realized, for example, as protrusions formed at the bottom of the connection members that mate with receptacles in the intermediate structure of the base modules. In yet another version, the connection members include shank portions with spacers extending from sides of the shank portions. The spacers prevent the attachment from sliding sideways along the connecting pin and help expose a large percentage of the connecting pin in the manner of an open belt hinge for easy cleaning and inspection.

Thus, a conveyor belt embodying features of the invention can be customized with a variety of attachments of different topologies, materials, or colors that are individually easier to mold than an integral module without sacrificing cleanability.

DRAWINGS

These and other features, aspects, and advantages of the invention are described in more detail in the following description, appended claims, and accompanying drawings, in which:

DETAILED DESCRIPTION

Figure 1:
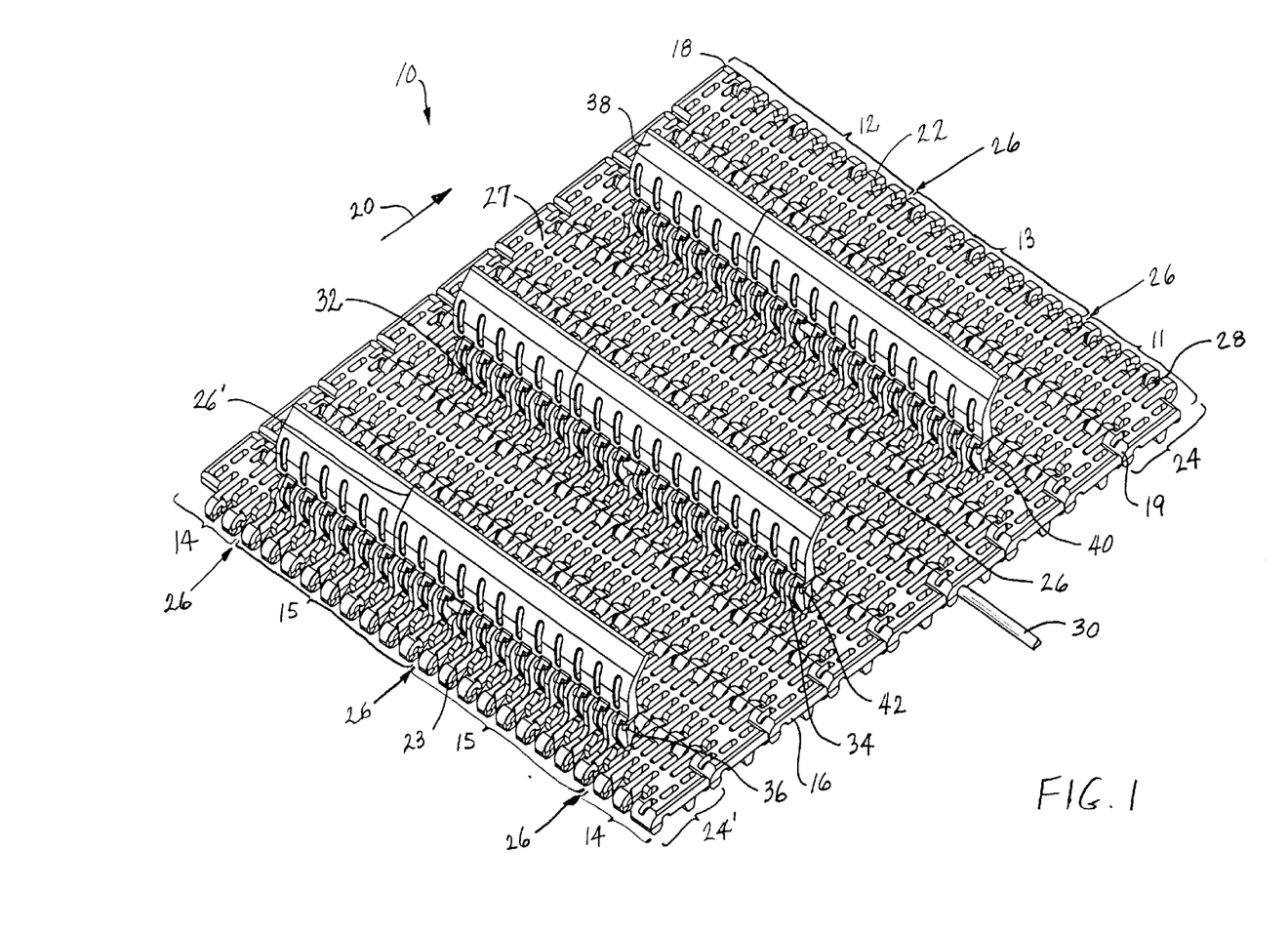
FIG. 1 is a top isometric view of a portion of a modular conveyor belt embodying features of the invention.

A portion of a modular conveyor belt embodying features of the invention is shown in FIG. 1. The modular conveyor belt 10 is constructed of a plurality of belt modules 11–15, including narrow flush grid edge modules 11, wide flush grid edge modules 12, flush grid interior modules 13, attachment-row narrow flush grid edge modules 14, and base modules 15. Although the modules could be made of metal or ceramics, they are preferably made of a thermoplastic material, such as polypropylene, polyethylene, nylon, acetal, or composites of those materials and other polymers or fillers. Preferably the plastic modules are formed by injection-molding. The flush grid modules 11–14 shown in the example of FIG. 1 are representative of the Series 800 Flush Grid modules manufactured and sold by Intralox, Inc. of Harahan, La., USA. The modules extend from a first end 18 to a second end 19 in the direction of belt travel 20, which may be bidirectional in some applications. A first set of hinge eyes 22 is arranged along the first end of each module; a second set 23 of hinge eyes is arranged along the opposite second end of each module. Each belt row 24, 24' is made up of, in this example, three or four side-by-side belt modules with seams 26 between adjacent modules. The flat upper surface of the modules forms an article-conveying surface 27. The rows are arranged end to end with the first set of hinge eyes of a row interleaved with the second set of hinge eyes of an adjacent row. Aligned openings 28 in the interleaved hinge eyes form a hinge passageway across the width of the belt. A hinge pin 30 resides in the hinge passageway to connect the rows together in a hinge that allows the belt to backflex and to articulate about conventional idler and motor-driven drive sprockets (not shown).

In the belt of FIG. 1, two flush-grid rows 24 alternate with one flighted row 24'. This is just one example of a belt that can be made of these modules. More modules can be added to each row to widen the belt. The rumor of flush grid rows between flighted rows could also be increased or decreased according to the application.

In FIG. 1, an attachment row 24' is formed by a pair of base modules 15 flanked at the edges of the belt by narrow flush grid edge modules 14. The edge modules have reinforced outer sides 16 that include hinge pin retention structure. The flush grid edge modules provide a flat region along the conveying surface to accommodate support shoes (not shown) in the belt returnway. The base modules include intermediate structure 32 between the first and second ends. In this example, the intermediate structure is in the form of a group of upstanding members 34 spaced apart across the width of the base modules. First aligned apertures 36 are formed in the upstanding members. A belt attachment, in this case a flight 38, has spaced-apart connection members 40 formed on its bottom. First aligned apertures 36 are formed through these connection members. The belt attachment is attached to the base modules by a first connecting pin 42 extending through the first passageway formed by all the aligned first apertures in the interleaved upstanding members and connection members. In the preferred example version of FIG. 1, the seams 26' between adjacent belt attachments do not coincide with the seams 26 in the underlying base modules. By spanning the seams in the base modules, the belt attachments increase the beam strength of the belt.

Figure 2:
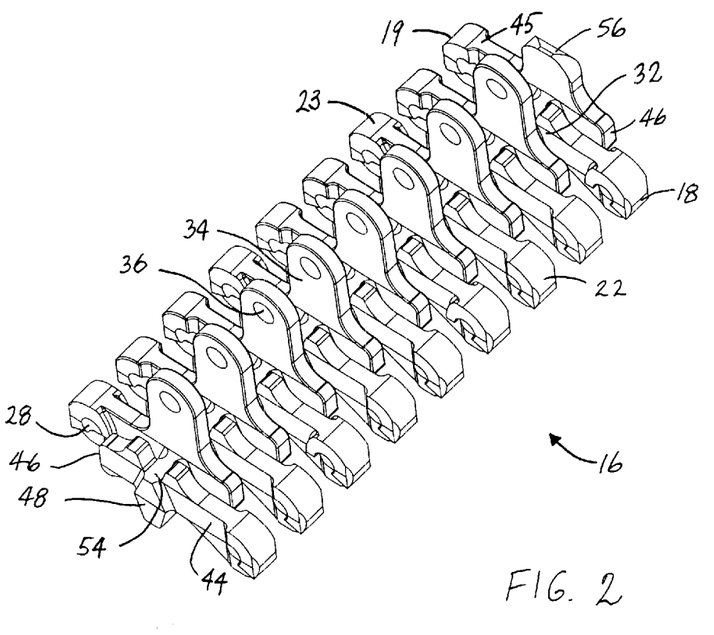
FIG. 2 is a top isometric view of an interior base module usable in the modular conveyor belt of FIG. 1.
Figure 3:
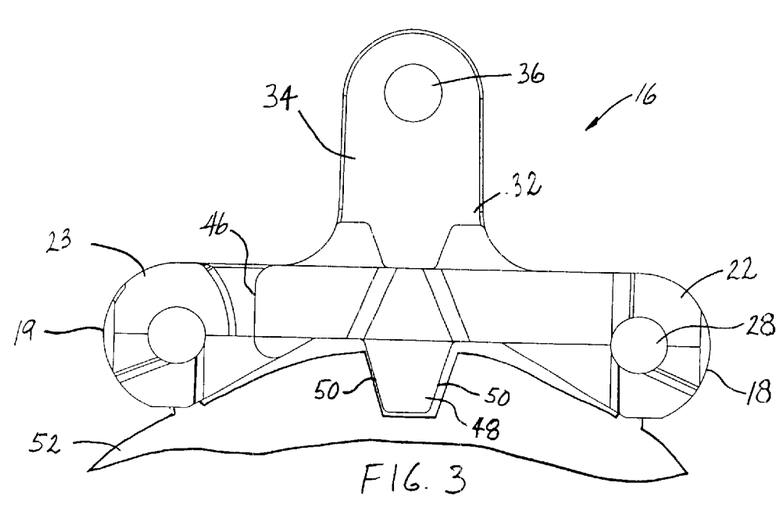
FIG. 3 is a side elevation view of the interior base module of FIG. 2.

An exemplary base module 15 is shown in more detail in FIGS. 2 and 3. The module has a set of hinge eyes 22, 23 along opposite ends 18, 19. Aligned openings 28 are formed in the hinge eyes. The hinge eyes 22 of the first set form the first ends of first parallel links 44. The opposite ends of the first links terminate in a stub end 46 that is recessed inward from the second end 19 of the module. The hinge eyes 23 of the second set form the second ends of second parallel links 45. The opposite ends similarly terminate in a stub end 46 recessed inward from the first end 18 of the module. Both sets of links are maintained parallel to each other by a transverse bar 48 arranged across the width of the module. The bottom half of the transverse bar forms driving surfaces 50 on opposite sides for receiving a driving force from a drive sprocket 52. The intermediate structure 32 of the base module is generally the module structure in the vicinity of the transverse bar in this example. The intermediate structure includes the upstanding members 34 extending upward from the junction of the transverse bar and the second parallel links 45. The upstanding members are vertical links resembling the hinge eyes. The intermediate structure also includes receptacles 54 formed in the first set of links 44 atop the transverse bar. The purpose of the receptacle is described subsequently. The outermost second link at one side of the base module substitutes an upstanding pin occlusion member 56 for a regular upstanding member 34. The occlusion member has no aperture and is shorter than the regular upstanding members. The occlusion member serves as a stop to prevent the connecting pin from working its way out of the passageway through the aligned apertures in the connection members of the attachments and the upstanding members of the base modules.

Figure 4:
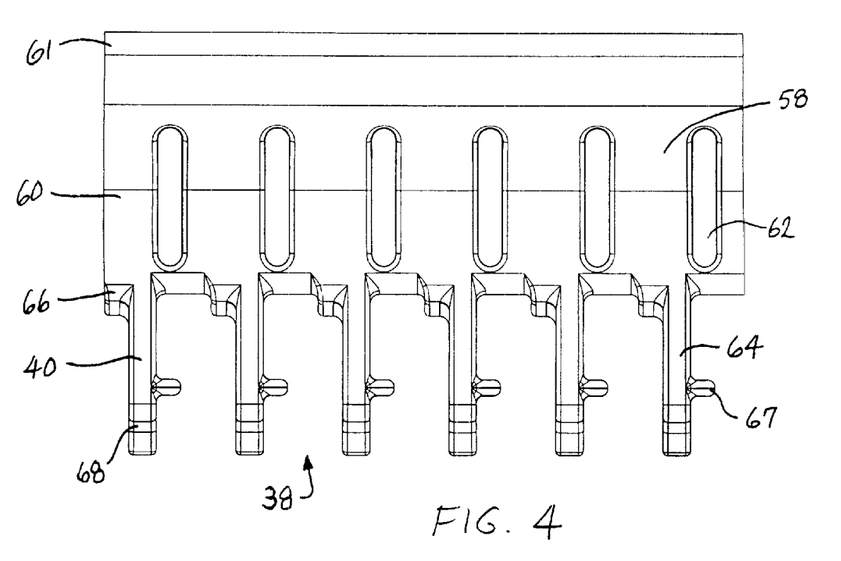
FIG. 4 is a front elevation view of a flight attachment usable in the conveyor belt of FIG. 1.
Figure 5:
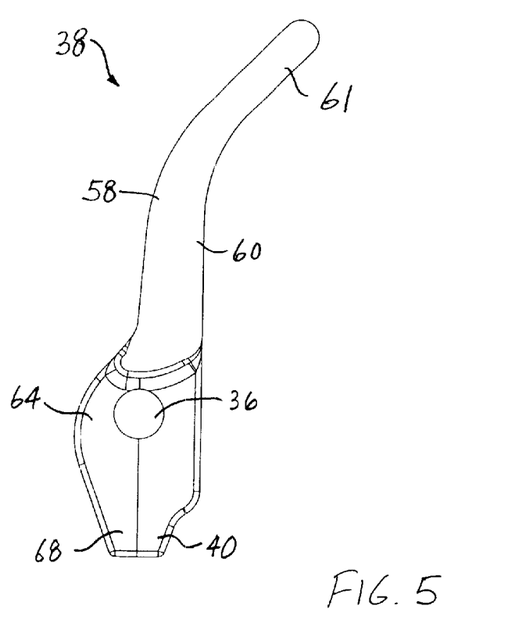
FIG. 5 is a side elevation view of the flight attachment of FIG. 4.

One version of belt attachment shown in detail by way of example is the flight attachment 38 shown in detail in FIGS. 4 and 5. The belt attachment includes an upper flight portion 58. In this case, the flight portion includes a generally vertical portion 60 and an oblique portion 61 extending to the distal end of the belt attachment. Perforations 62 are formed in the flight portion to allow the belt to drain when conveying articles out of liquid-filled vats. Depending from the belt attachment are the connection members 40 with shank portions 64. An aperture 36 formed in each of the connection members is aligned with the apertures in the other connection members. Spacers 66, 67 extend from the sides of the shank portions. The distal ends of the shank portions terminate in protrusions 68 that mate with the receptacles 54 in the base modules.

Figure 6:
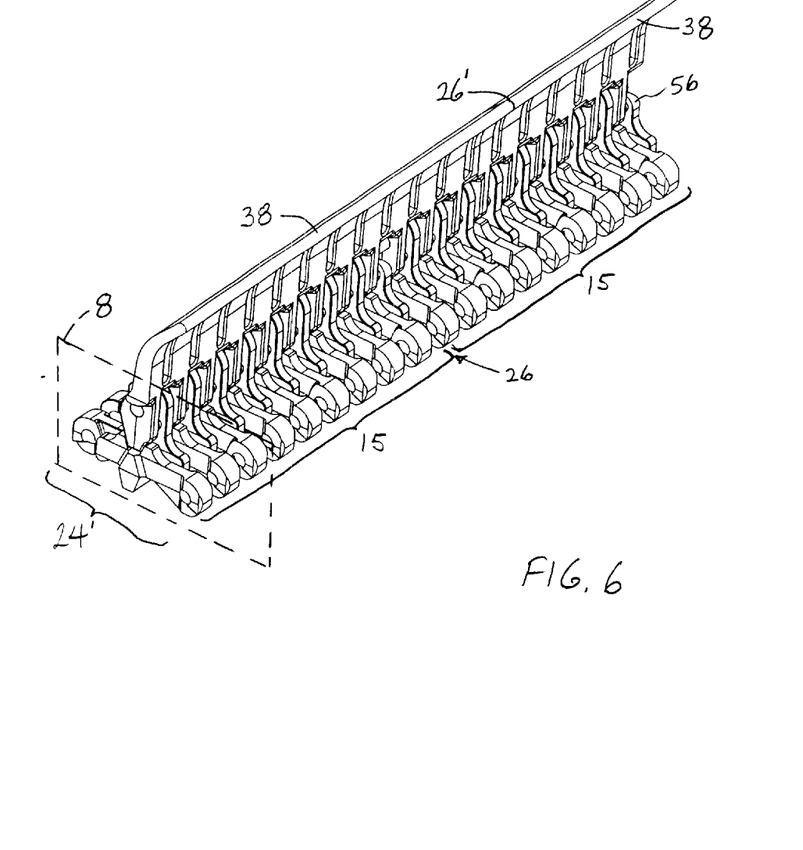
FIG. 6 is an isometric view of an interior portion of a belt-attachment row of the modular conveyor belt of FIG. 1.
Figure 7:
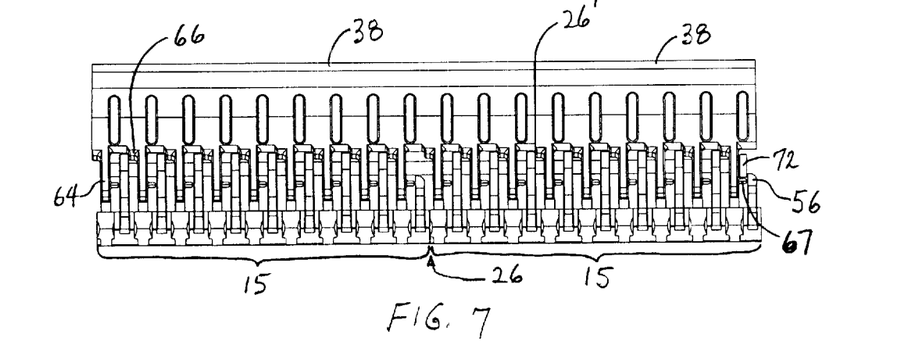
FIG. 7 is a front elevation view of the belt row of FIG. 6.
Figure 8:
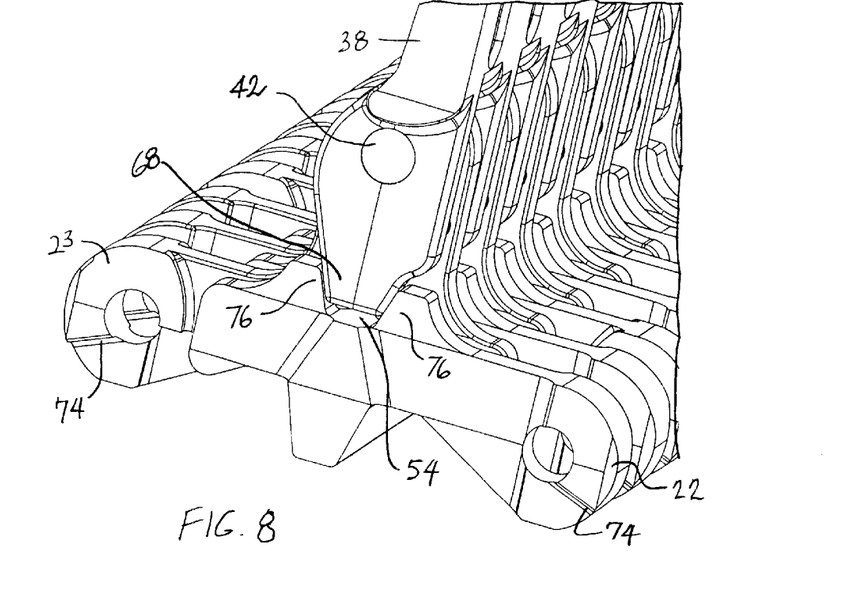
FIG. 8 is a blown-up partial view of a side of the belt row of FIG. 6.

The connection of the belt attachment 38 to a base module 15 is shown in more detail in FIGS. 6–8, which illustrate the flight portion of row 24' of FIG. 1. The row portion comprises two flighted belt attachments 38 extending the full width of the base modules 15 and held to the base modules by a connecting pin 42. The seam 26 between the side-by-side base modules is offset from the seam 26' between the belt attachments in bricklay fashion for additional beam strength. The upstanding occlusion member 56 at one side of the rightmost module prevents the connecting pin 42 from working its way out of the passageway formed by the aligned apertures in the interleaved connection members of the belt attachments and the upstanding members on the base modules. An enlarged head 72 at one end of the connecting pin keeps it from entering the smaller-diameter passageway. The occlusion member prevents the enlarged head from retreating out of the side of the row. In this version of connecting pin, which could be conventionally molded or extruded of a thermoplastic material such as polypropylene, polyethylene, acetal, or nylon, for example, the connecting pin or its head is flexible enough to bend on entry into the passageway during belt construction. It would, of course, be possible to retain connecting pins of other constructions, such as headless or metal, using other conventional retention techniques used for hinge pins in modular belts.

The effect of the spacers 66, 67 extending from the sides of the shank portions 64 of the connection member 40 is best shown in FIG. 7. As shown, the spacers position the attachments laterally with respect to the modules and allow a major percentage of the connecting pin to be exposed for washing and inspection. This cleanability aspect is important in food and, especially, in meat and poultry applications.

The hinge of this particular modular belt is also easy to clean as best shown in FIG. 8. The hinge eyes 22, 23 include an undercut 74 on the bottom side. This undercut increases the separation between the bottoms of the interleaved hinge eyes of adjacent rows and exposes more of the hinge pin for cleaning and inspection.

The stabilizing effect of the mating of the protrusion 68 at the bottom of the shank portion 64 of the connection member with the receptacle 54 is shown in FIG. 8. With the protrusion received in the receptacle, shoulders 76 forming the sides of the receptacle prevent the attachment 38 from rotating out of position about the axis of the connecting pin. Thus, in this version, the protrusion, acting in conjunction with the connecting pin, serves as stabilizing structure that interfits with the intermediate structure of the base module to keep the attachment anchored in place.

Figure 9:
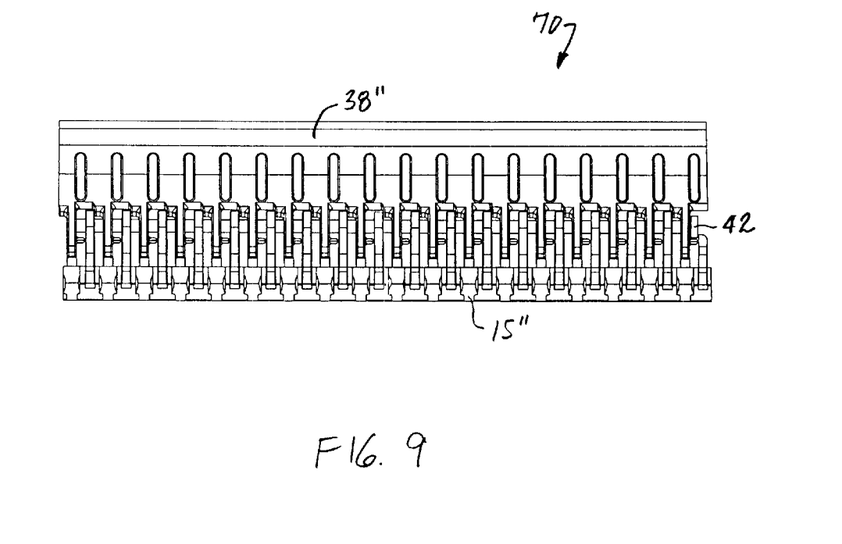
FIG. 9 is a front elevation view of a three-piece belt module usable in the modular conveyor belt of FIG. 1.

The bricklaid interior row portion shown in FIGS. 6–8 could alternatively be replaced by a three-piece module 70 without seams, as shown in FIG. 9. In this example, the belt attachment 38" is coextensive with the base module 15", but the attachment could extend beyond the sides of the base module or could be recessed in from both side edges. A connecting pin 42, which connects the belt attachment to the base module, is the third piece of the module. The other structural features of the interior row portion of FIGS. 6–8 could be replicated in the three-piece module.

A look at FIG. 9 suggests the difficulty of molding a unitary belt module with a perforated belt flight. The complex topology with hinge-eye openings transverse to perforations and with the intricate intermediate structure of the module and with the non-planar flight portion make a two-piece mold unthinkable. Only an expensive, complex mold could be used to mold such a unitary flighted module. And it's not usually practical to have individual, expensive multi-piece molds for many varieties of attachment modules. But the advantage of the module of FIG. 9 is that, because the topology of the base module alone is simple, the module can be molded with an inexpensive two-piece mold. The same is true of the perforated, curved flight attachment. The base module can accept a variety of belt attachments that can be molded in simpler molds. Thus, many varieties can be offered at lower cost.

Figure 10:
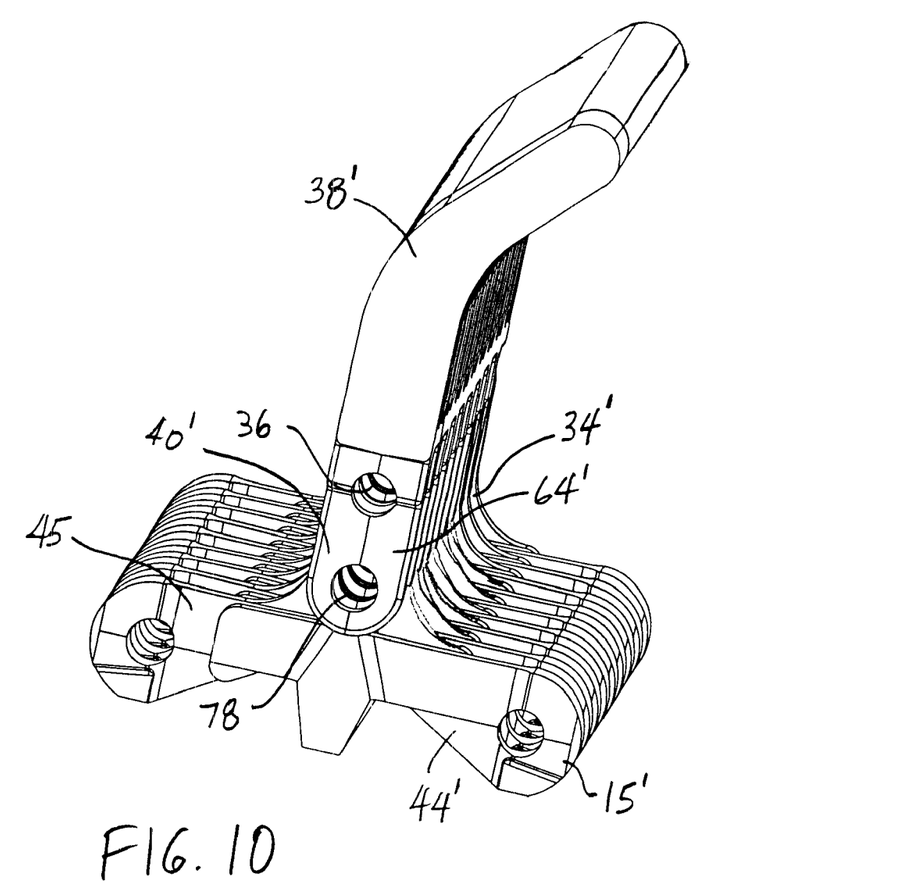
FIG. 10 is an isometric view of another version of base module and belt attachment usable in the modular conveyor belt of FIG. 1.

FIG. 10 shows another version of base module and attachment with different stabilizing structure. In this version, the first parallel links 44' of the base module 15' do not form a receptacle at the intermediate structure. The shank portions 64' of the belt attachment 38' include second aligned apertures 78 parallel to the first aligned apertures 36. The upstanding members 34' on the second parallel links 45' likewise include second aligned apertures that form a second passageway with the aligned second apertures of the interleaved connection members 40'. A second connecting pin is received in the second passageway. Thus, two connecting pins in separate passageways serve to interconnect and stabilize the attachment, or a variety of attachments with compatible connection members, to the base module. With a spacer arrangement similar to that of the other versions, the connecting pins are exposed for easy cleaning and inspection.

Although the invention has been described in detail with respect to a couple of versions by way of example, other variations and versions are possible. For example, the base module as described is of an open-grid construction. It could alternatively have a largely continuous upper surface with or without openings, or perforations, such as are commonly referred to as "flat top" and "perforated flat top" modules. As another example, the stabilizing function of the protrusions from the belt attachment received in the receptacles on the base modules could alternatively be performed by protrusions from the base module received in receptacles formed in the distal ends of the bottom of the shank portions of the belt attachment's connection members. As yet another example, the connecting pin could alternatively comprise a number of segments or could be replicated by stubs extending from the sides of the upstanding members into the apertures of the adjacent, interleaved upstanding members, or vice versa. Therefore, as these examples suggest, the scope of the claims should not be limited to the description of the preferred versions.

I claim:

1. A modular conveyor belt, comprising:
   a series of rows of belt modules wherein each row includes at least one belt module extending from a first end to a second end in the direction of belt travel and including a first set of hinge eyes along the first end and a second set of hinge eyes along the second end, wherein the hinge eyes form aligned openings therethrough, the rows being arranged end to end with the first set of hinge eyes of a row interleaved with the second set of hinge eyes of an adjacent row;

a plurality of hinge pins disposed in the openings in the interleaved hinge eyes at the ends of each row to connect adjacent rows into a conveyor belt having a hinge between adjacent rows;

selected ones of the belt modules being base modules forming first aligned apertures therethrough;

a belt attachment including spaced apart connection members with first aligned apertures therethrough, wherein the connection members are arranged together with the base modules with the first apertures of the connection members and the base modules in alignment; and a first connecting pin extending through the aligned first apertures to retain the belt attachment to a base module.

2. A modular conveyor belt as in claim 1 further comprising a second connecting pin, and wherein the base modules form second aligned apertures therethrough offset from the first aligned apertures, and wherein the belt attachment includes second aligned apertures offset from the first aligned apertures, the second aligned apertures aligning with the second aligned apertures in the base modules when the first apertures are aligned with each other to receive the second connecting pin.

3. A modular conveyor belt as in claim 1 further including stabilizing structure that acts in conjunction with the first connecting pin to anchor the belt attachment to the base modules.

4. A modular conveyor belt as in claim 3 wherein the stabilizing structure is disposed on the belt attachment and interfits with the base modules.

5. A modular conveyor belt as in claim 4 wherein the stabilizing structure comprises protrusions formed at bottom ends of the connection members.

6. A modular conveyor belt as in claim 5 wherein the base modules form receptacles for receiving the protrusions.

7. A modular conveyor belt as in claim 1 wherein the belt attachment spans the seam formed between two side-by-side base modules in a belt row.

8. A modular conveyor belt as in claim 1 wherein the belt attachment includes a flight portion.

9. A modular conveyor belt as in claim 8 wherein the flight portion forms perforations therethrough.

10. A modular conveyor belt as in claim 1 wherein the base modules further include intermediate structure comprising upstanding members spaced apart across the width of the base modules that interleave with the connection members of the belt attachment.

11. A modular conveyor belt as in claim 10 wherein the connection members of the belt attachment further include shank portions and spacers extending from sides of the shank portions to space the shank portions from the upstanding members.

12. A modular conveyor belt as in claim 10 further comprising a pin occlusion member upstanding from the intermediate structure of the base modules at an outermost position relative to the upstanding members to serve as a stop to prevent the first connecting pin from working its way out of the first passageway.

13. A modular conveyor belt as in claim 1 wherein the first connecting pin extends through all the aligned first apertures on a belt row.

14. A three-piece belt module comprising:

a base belt module including upstanding members spaced apart across the width of the base module with aligned apertures through the upstanding members;

an attachment including spaced apart connection members with aligned apertures therethrough, wherein the connection members interleave with the upstanding members with the apertures of both aligned to form a passageway across the width of the module;

a connecting pin disposed in the passageway to connect the attachment to the base module; and stabilizing structure that acts in conjunction with the connecting pin to anchor the attachment in place.

15. A belt module as in claim 14 wherein the attachment includes a flight portion.

16. A belt module as in claim 15 wherein the flight portion forms perforations therethrough.

17. A belt module as in claim 14 wherein the connection members include shank portions and spacers extending from sides of the shank portions to space the shank portions from the upstanding members.

18. A belt module as in claim 17 wherein the connection members further include protrusions extending from distal ends of the shank portions and wherein the base belt module further includes receptacles for receiving the protrusions.

19. A modular conveyor belt, comprising:

a series of rows of belt modules wherein each row includes at least one belt module extending from a first end to a second end in the direction of belt travel and including a first set of hinge eyes along the first end and a second set of hinge eyes along the second end, wherein the hinge eyes form aligned openings therethrough, the rows being arranged end to end with the first set of hinge eyes of a row interleaved with the second set of hinge eyes of an adjacent row;

a plurality of hinge pins disposed in the openings in the interleaved hinge eyes at the ends of each row to connect adjacent rows into a conveyor belt having a hinge between adjacent rows;

selected ones of the belt modules forming base modules including intermediate structure between the first end and the second end, the intermediate structure comprising upstanding members spaced apart across the width of the base modules and forming first aligned apertures therethrough;

a belt attachment including spaced apart connection members with first aligned apertures therethrough, wherein the connection members interleave with the upstanding members of the base modules with the first apertures of the interleaved connection members and upstanding members aligned to form a first passageway; and a first connecting pin extending through the first passageway to retain the belt attachment to a base module.

20. A modular conveyor belt as in claim 19 further comprising a second connecting pin, and wherein the upstanding members of the base modules form second aligned apertures therethrough offset from the first aligned apertures, and wherein the belt attachment includes second aligned apertures offset from the first aligned apertures, the second aligned apertures aligning with the second apertures in the upstanding members when the first apertures are aligned with each other to form a second passageway to receive the second connecting pin.

21. A modular conveyor belt as in claim 19 wherein the belt attachment further includes stabilizing structure that interfits with the intermediate structure of the base modules.

22. A modular conveyor belt as in claim 21 wherein the stabilizing structure comprises protrusions formed at bottom ends of the connection members.

23. A modular conveyor belt as in claim 22 wherein the intermediate structure comprises receptacles for the protrusions.

24. A modular conveyor belt as in claim 19 wherein the belt attachment spans the seam formed between two side-by-side base modules in a belt row.

25. A modular conveyor belt as in claim 19 wherein the belt attachment includes a flight portion.

26. A modular conveyor belt as in claim 19 wherein the connection members of the belt attachment further include shank portions and spacers extending from sides of the shank portions to space the shank portions from the upstanding members.

27. A modular conveyor belt as in claim 19 further comprising a pin occlusion member upstanding from the intermediate structure of the base modules at an outermost position relative to the upstanding members to serve as a stop to prevent the first connecting pin from working its way out of the first passageway.

* * * * *